Feb. 23, 1965   H. W. KNOX   3,170,195
VULCANIZING MEMBER WITH VENTING MEANS
Filed Feb. 20, 1961

United States Patent Office 3,170,195
Patented Feb. 23, 1965

3,170,195
VULCANIZING MEMBER WITH VENTING MEANS
Harold Wayne Knox, Akron, Ohio, assignor to The Firestone Tire & Rubber Company, Akron, Ohio, a corporation of Ohio
Filed Feb. 20, 1961, Ser. No. 90,475
2 Claims. (Cl. 18—45)

The present invention relates to improvements in tire vulcanizing members, and more particularly to the provision of improved venting means in such members, which generally fall into one of two classes: the cylindrical bladder, and the toroidal bag. In both cases, the vulcanizing member is placed within a substantially cylindrical, uncured tire which is then expanded to correct toroidal tire shape for the vulcanization process.

In this procedure, air tends to become trapped and form pockets between the outer wall of the vulcanizing member and the inner wall of the tire. Such air pockets may, during the vulcanizing process, be forced into the tire body and thus cause blisters and ply separation, or the pockets may remain in place and create blemishes and uneven areas on the inner surface of the tire. This trapping of air is a particularly grave problem where the vulcanizing member comprises a cylindrical bladder, since the diameter thereof is expanded greatly while the uncured tire is changed from cylindrical to toroidal shape.

It has been proposed in the past to place venting grooves in the outside surface of the curing bag to attempt to bleed off the air which otherwise becomes trapped. To this end, prior art air bags and bladders have sometimes been provided on their tire-contacting surfaces with parallel channels. Such grooves, however, whether they extend axially or at an angle to the axis of the bladder, have several disadvantages.

Grooving, regularly spaced and of necessity deeply cut, weakens the bladder structure and tends to promote cracking and early flex failure therein. Further, the regularity of such grooving encourages and increases the tendency of the tire cords to follow the grooved contour on the curing bag. The resulting waviness of the tire cords leads to uneven and nonuniform tires. It has been suggested that the cord-waviness be counteracted by increasing the amount of rubber on the inner tire wall; this results, however, in reduced tire life due to flex failures, and cracking along the grooves.

Further difficulties are experienced with this type of groove venting, where preparations are sprayed on either the interior of the tire or on the exterior of the bladder to insure that the bladder will release readily from the vulcanized tire. The solids in such preparations tend to become trapped in the bladder grooves; a filled groove cannot perform its venting function properly, and soon such a groove will promote trapped air, rather than prevent it.

Further, this type of grooving tends to support the interior surface of the tire only along regularly spaced areas, tending to set up regularly occurring stresses in the tire, which encourage early failures.

Mere increase of the depth of the known, parallel grooving solves nothing, for this is attended by the increased tendency of the more flexible portions of the tire (sidewall areas) to become deformed into these deepened channels.

The disadvantages of using the known bladders or airbags with parallel or regularly oriented grooving therefore are as follows:

Premature cracking and flex failures both in the tire and in the curing bladder, contributing to shortened tire- and bladder-life; the tendency of such known grooving to trap solids, thus making them ineffective; the tendency of the tire cords in the inner ply of the tire to become wavy from attempting to follow the regular pattern of the parallel grooving; and too regularly spaced tire support areas, encouraging stress failure.

The present invention differs from the known structures in providing a vulcanizing bag or bladder which is not subject to the above disadvantages; which has a long life; which does not promote cracking or flex failure; which prevents the trapping of air through the filling of vent grooves; which prevents the forming of wavy cords in the band ply of the tire; which provides a more evenly distributed weight support for the interior of the tire.

According to the present invention, there is provided a vulcanizing bladder or bag, which is provided with a new means of venting on the tire-contacting surface of the vulcanizing bladder. This means comprises a plurality of randomly distributed land portions bordered by a series of interconnected venting channels, which gives to the surface of the vulcanizing bladder the appearance of a large number of islands, separated by channels.

These land areas may be of any desired shape, either regular or irregular, geometrical or free-form, angular or curvilinear, or any combination of these, so long as they are relatively small, so as to provide a large number of interconnected channels therebetween.

The islands, or land areas, may be produced by a recurring pattern of crossing venting channels, or may be the result of completely randomly directed, or irregularly occurring, grooves.

By producing on the surface of the vulcanizing bladder a large number of tire-supporting land areas, in place of the markedly defined, regularly occurring, groove-system heretofore used, the escape of air between the inner ply of the tire and the bladder surface is facilitated.

Further, since the air which is normally trapped between the tire and the bladder may now move along the vent channels of least resistance to reach the outside atmosphere, no danger exists that air will remain trapped simply because a single vent groove is unavailable to bleed off the air.

Further, instead of providing regularly spaced vent grooves and land strips, which tend to cause wavy cords in the tire, the present invention provides instead a large number of irregular areas which support the tire as on a large number of fingers.

It is the object of the present invention, therefore, to provide a vulcanizing bladder with improved means for venting air from between tire and bladder.

It is further object of the present invention to provide on the surface of a curing bladder or airbag a series of land areas separated by venting channels, in such a manner as to provide multiple passages for the escape of air along the surface of the vulcanizing member.

Yet another object of this invention is to provide venting means on a vulcanizing member, which venting means form a plurality of randomly spaced, randomly sized support areas for the inner surface of the tire.

It is a further object of this invention to provide a vulcanizing member which will present to the interior of the tire a plurality of adjacent support surfaces.

Other objects and advantages of the present invention will become apparent from the following description of the preferred form of the invention, reference being had to the accompanying drawings in which.

In the vulcanization of pneumatic tires, there is generally used one of two different types of internal pressurized members. One such member is generally known as an airbag and comprises a generally toroidal member, shaped like an inner-tube. Such an airbag is shown at 1 in FIGURE 5. In use, the airbag is placed inside an unvulcanized cylindrical tire prior to the vulcanization thereof. The airbag is inflated and expanded while the beads of the tire are brought closer together, so that the tire will generally conform to the toroidal shape of the airbag within it. The tire and its airbag are thereafter placed in a mold and the tire cured under heat and pressure.

For purposes of simplicity, the following description will refer to a vulcanizing bladder, but it will be understood that the invention may refer equally well to the conventional airbag-type of vulcanizing member.

Figure 1:
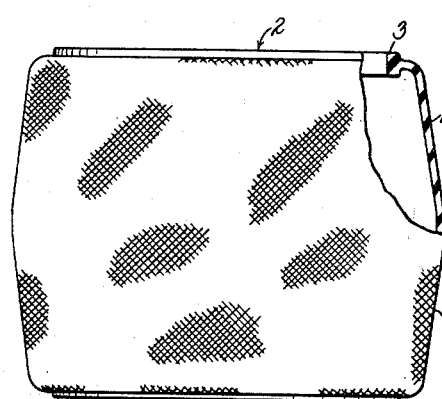
FIGURE 1 is a side elevation of the vulcanizing member of the invention, partially broken away and in section.
Figure 3:
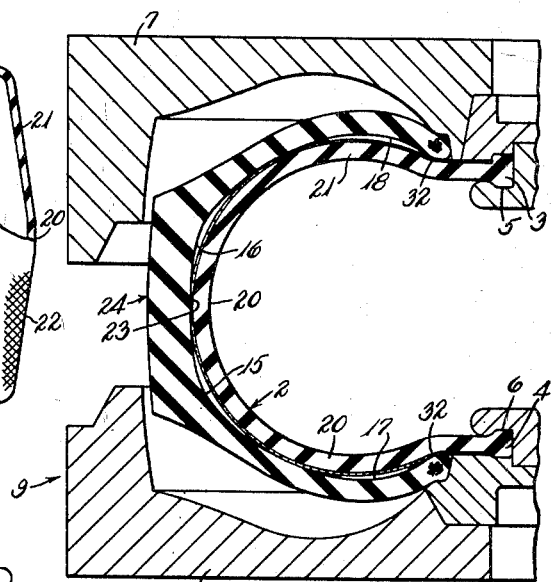
FIGURE 3 is a fragmentary sectional view of a tire vulcanizing mold incorporating the member of the invention, the mold being shown in partially closed position.

Another type of vulcanizing member, generally known as a bladder, is shown in FIGURE 1. The vulcanizing bladder 2 is generally originally of cylindrical or barrel shape. In use, an unvulcanized cylindrical tire is placed about the outside of the bladder, whereupon the bladder is expanded into toroidal form, along with the tire, as shown, for example, in FIGURE 3. The ends 3 and 4 of the vulcanizing bladder 2 may be held as at 5 and 6 with relation to the respective halves 7 and 8 of the tire mold 9, and the bladder is caused to expand into the toroidal form shown in FIGURE 4 when the mold is completely closed. Alternatively, the vulcanizing bladder may be placed in the tire in an operation prior to insertion of the entire tire-and-bladder unit in the curing press.

During the initial stages of vulcanization of the tire, as the vulcanizing bag or bladder is expanded against the inner surface of the tire, air pockets tend to become trapped between the outer surface of the vulcanizing bag and the inner surface of the tire. The shoulder areas 15, 16 and the bead areas 17, 18 of the tire are particularly susceptible to this air trapping.

The bladder 2 has a central portion 20 of increased diameter. Between the central portion and the ends of the bladder are shown sloping sidewall portions 21 and 22. As the bladder is expanded into an unvulcanized tire, it will be noted that the central, large-diameter portion 20 of the bladder will contact the central portion 23 of the interior of the tire 24 first, whereafter the wall portions 21 and 22 of the bladder will progressively roll outwardly along the inner surface of the tire towards the bead areas 17 and 18, which will finally be contacted by end portions 3 and 4 of the bladder.

Figure 2:
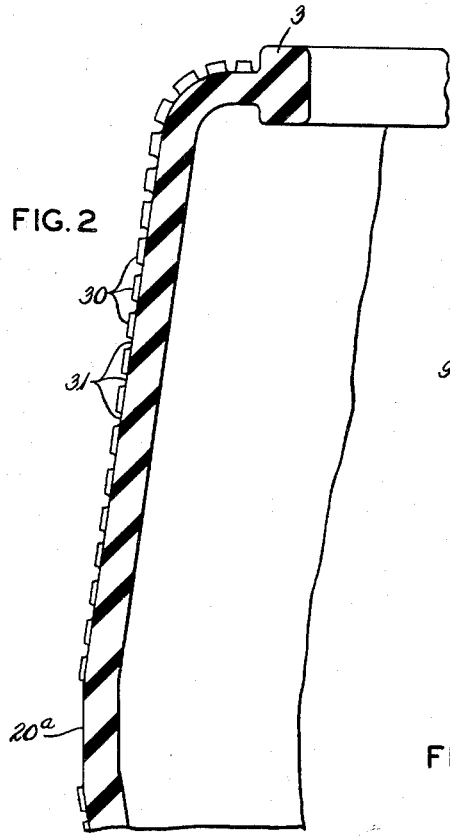
FIGURE 2 is an enlarged, fragmentary sectional view of a vulcanizing member similar to that of FIGURE 1.
Figure 5:
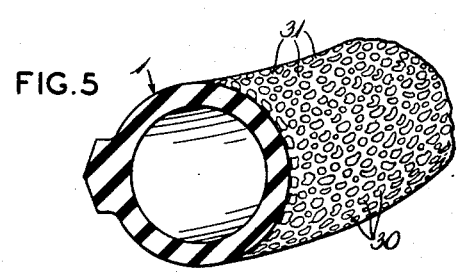
FIGURE 5 is a fragmentary, sectional perspective view of another type of vulcanizing member, embodying the invention.

The exterior of the vulcanizing bladder surface 20, 21, 22 is provided with a plurality of differently-sized venting means, best seen in FIGURES 2 and 5. The venting means shown comprises a large number of raised "islands" or land portions 30. The circumferences of the land portions 30 are shown in FIGURE 5 to be of curvilinear and of free form, but they may be geometrical or straight-sided in shape. It is an important feature of the present invention that the land areas 30 are surrounded by interconnected venting channels 31, traversing the surface of the vulcanizing bladder in all directions.

Truck tires in the 11.00–20 size have been vulcanized successfully, using a bladder having a pebble grain surface with free-form land areas of varying size having lateral dimensions in the range of 1/16" to 5/16", separated by venting channels having a width of up to about 1/16", the land areas being raised varying amounts above the surface of the venting bladder. The raised height near the bladder crown was .015"; the height near the bead areas of the tire, .030".

Other useful bladders have been produced with vent channels having depths of .010" at the crown, and .020" near the tire bead areas. Bladders having land areas differing from the above are useful, as are bladders in which the venting channels have uniform depth. The channel depth may also change uniformly from the crown area of the bladder toward the bead-engaging portions thereof, or may change by steps.

For smaller tires, such as, for example, passenger tires of the 6.50–13 size, a suitable venting pattern used has dimensions reduced by about 1/3. For tires larger than the truck sizes, such as, for example, tires for off-the-road use, dimensions of approximately 1½ times the size of those used in truck tires are useful.

Additionally, truck tires in the 10.00–20 size have been successfully cured using bladders provided with a more regularly occurring design of criss-crossing venting channels forming geometric square or diamond land areas. Successful use of this type of venting pattern was had by using venting channels of a depth of approximately .015 inch.

The above dimensions are examples, and it will be understood that a wide range of sizes, shapes and dimensions, as well as combinations thereof, may be used, so long as adequate tire support and sufficient venting means are provided.

Figure 4:
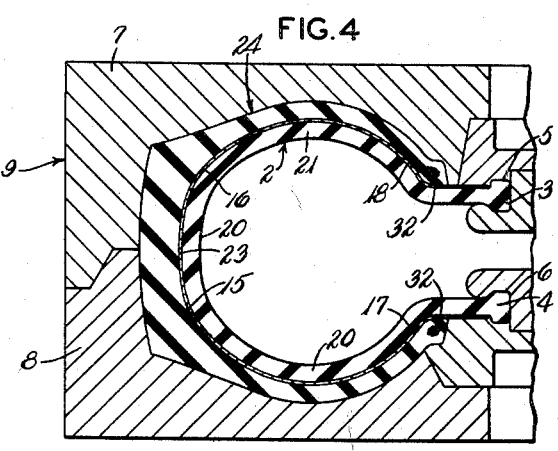
FIGURE 4 is a view similar to FIGURE 3, with the mold in the fully closed position.

It will be noted that the novel venting means is shown in FIGURE 4 to extend along the outer surface of the venting bladder all the way beyond what in the finished tire is the toe area 32 of the tire bead.

Since the large-diameter central portion 20 of the bladder 2 initially engages the central portion 23 of the tire, no trapping of air is generally found to take place here. It may, therefore, not be necessary to provide the central portion of the vulcanizing bladder with the venting means of the present invention, as shown at 20a in FIGURE 2. In order, however, to insure complete venting of all air from between the tire and the bladder, it may be preferred to continue the venting means over the entire surface of the vulcanizing bladder, such as shown in FIGURES 1, 3, 4 and 5, so that the inner surface of the vulcanized tire, from bead to bead, will exhibit the typical configuration provided by the venting means of the invention.

As the vulcanizing bladder 2 rolls progressively along the inner surface of the tire, from the initial area of engagement 23, venting becomes increasingly critical, the bead areas 17 and 18 and the shoulder areas 15 and 16 of the tire being particularly sensitive in this regard. Accordingly, the depth of the venting channels 31 may be increased towards the ends 3 and 4 of the vulcanizing bladder, so as to form more open and effective means for bleeding off air that may otherwise become trapped.

As shown, for example, in FIGURE 2, the venting near the central area of the vulcanizing bladder has a depth of approximately .015"; towards the ends of the vulcanizing bladder, the depth of the venting channels has been increased to approximately .030".

This particular form of the invention is particularly successful, since this change in venting-groove depth toward the bead areas of the tire provides increased air discharge areas in the locality where the entire trapped air mass must eventually be vented out. Further, this increased depth is provided only toward the tire bead areas, i.e. where the tire construction is firmer and no danger exists of deforming the tire wall because of deep venting.

It will be seen from the foregoing discussion, that there has been provided, through this invention, improved means for venting a vulcanizing bladder, to prevent the trapping of air between the exterior of the vulcanizing bladder and the inner surface of the tire, and to increase both tire- and bladder-life.

Venting of the bladder surface in this manner thus provides a plurality of venting channels, interconnected to provide free egress for any air that might otherwise become trapped between tire and bladder. If any one channel portion should, by accident, become plugged up or otherwise be rendered ineffective, the interconnection with adjacent channel portions will immediately form a new path which will lead away the air which otherwise would have become trapped.

Heretofore, the regularly spaced, parallel longitudinal grooving has provided only support along certain defined areas, which has caused wrinkling and wavy cords in the inner ply of the tire, leading to scrap tires.

The novel venting means of this invention, however, provides a more uniformly vulcanized tire, in that a large number of bladder areas are provided for the uniform support of the interior of the tire.

Although a preferred form of the invention has been described and shown in the drawings, it will be understood that variations and modifications may be made by anyone skilled in the art without departing from the scope of the present invention, which is defined by the following appended claims.

What is claimed is:

1. A member to exert force upon the inner surface of an unvulcanized pneumatic tire during the shaping and vulcanizing operations in a tire mold, comprising an expansible, rubbery diaphragm wall having means in the outer surface thereof to vent air outwardly from between said wall and said inner tire surface to a point of escape in the tire mold beyond the tire, said means comprising a plurality of land portions of limited area distributed over said wall and beyond the bead areas of said tire and separated by interconnected channels of varying depth traversing said diaphragm wall.

2. A vulcanizing member according to claim 1, wherein the said channels have maximum depth at the bead areas of the tire.

References Cited in the file of this patent

UNITED STATES PATENTS

| | | |
|---|---|---|
| 2,476,831 | Spencer | July 19, 1949 |
| 2,678,468 | Smith | May 18, 1954 |
| 2,712,847 | Harris | July 12, 1955 |
| 2,790,205 | Parker | Apr. 30, 1957 |
| 2,851,729 | Kalkofen | Sept. 16, 1958 |
| 2,962,757 | Slemmons et al. | Dec. 6, 1960 |
| 2,983,638 | Quehl | May 9, 1961 |